US007849321B2

(12) United States Patent
Mizrah

(10) Patent No.: US 7,849,321 B2
(45) Date of Patent: Dec. 7, 2010

(54) AUTHENTICATION METHOD OF RANDOM PARTIAL DIGITIZED PATH RECOGNITION WITH A CHALLENGE BUILT INTO THE PATH

(75) Inventor: Len L. Mizrah, San Carlos, CA (US)

(73) Assignee: Authernative, Inc., Redwood City, CA (US)

( * ) Notice: Subject to any disclaimer, the term of this patent is extended or adjusted under 35 U.S.C. 154(b) by 1141 days.

(21) Appl. No.: 11/466,697

(22) Filed: Aug. 23, 2006

(65) Prior Publication Data

US 2008/0072045 A1    Mar. 20, 2008

(51) Int. Cl.
*G06F 21/00* (2006.01)
(52) U.S. Cl. .............. 713/182; 713/168; 713/169; 713/171; 726/5; 726/6
(58) Field of Classification Search ......... 713/168–171, 713/182; 726/5, 6
See application file for complete search history.

(56) References Cited

U.S. PATENT DOCUMENTS

| | | |
|---|---|---|
| 5,177,789 A | 1/1993 | Covert |
| 5,276,314 A | 1/1994 | Martino et al. |
| 5,425,102 A | 6/1995 | Moy |
| 5,428,084 A | 6/1995 | Swarup et al. |
| 5,465,084 A | 11/1995 | Cottrell |
| 5,559,961 A | 9/1996 | Blonder |
| 5,606,609 A | 2/1997 | Houser |
| 5,608,387 A | 3/1997 | Davies |
| 5,664,099 A | 9/1997 | Ozzie et al. |

(Continued)

FOREIGN PATENT DOCUMENTS

EP    0564832 A1    10/1993

(Continued)

OTHER PUBLICATIONS

"Pass-Go, a New Graphical Password Scheme" by Hai Tao; Thesis submitted to the Faculty of Graduate and Postdoctoral Studies For the Master of Applied Science degree in Electrical and Computer Engineering © Hai Tao, Ottawa, Canada, Jun. 2006 110 pages University of Ottawa.*

(Continued)

*Primary Examiner*—Taghi T Arani
*Assistant Examiner*—Jason Lee
(74) *Attorney, Agent, or Firm*—Haynes Beffel & Wolfeld LLP

(57) ABSTRACT

An interactive method for authentication is based on two shared secrets, including a first shared secret in the form of an ordered path on the frame of reference, and a second shared secret in the form of locations on the frame of reference at which characters identifying a subset of the ordered path are to be displayed. An instance of the frame of reference comprises a set of characters which is arranged in a random or other irregular pattern. Authentication requires that a user enter the characters in the displayed instance of the frame of reference found in the locations in the random subset of the ordered path by indicating characters either in these locations, or any other locations having the same characters. Thus, a secret challenge identifying the random partial subset is embedded within the displayed instance of the graphical representation of the frame of reference.

18 Claims, 15 Drawing Sheets

U.S. PATENT DOCUMENTS

| | | | |
|---|---|---|---|
| 5,821,933 | A | 10/1998 | Keller et al. |
| 5,928,364 | A | 7/1999 | Yamamoto |
| 5,956,699 | A | 9/1999 | Wong et al. |
| 6,085,320 | A | 7/2000 | Kaliski, Jr. |
| 6,089,053 | A | 7/2000 | Colombera |
| 6,092,202 | A | 7/2000 | Veil et al. |
| 6,141,751 | A | 10/2000 | Ogawa |
| 6,189,098 | B1 | 2/2001 | Kaliski, Jr. |
| 6,209,104 | B1 * | 3/2001 | Jalili ........................... 726/18 |
| 6,321,339 | B1 | 11/2001 | French et al. |
| 6,332,192 | B1 | 12/2001 | Boroditsky et al. |
| 6,367,015 | B1 | 4/2002 | Kubo et al. |
| 6,571,336 | B1 | 5/2003 | Smith, Jr. |
| 6,603,854 | B1 | 8/2003 | Judkins et al. |
| 6,789,110 | B1 | 9/2004 | Short et al. |
| 6,812,938 | B2 | 11/2004 | Pinnell |
| 6,934,860 | B1 | 8/2005 | Goldstein |
| 6,980,081 | B2 | 12/2005 | Anderson |
| 7,007,168 | B2 | 2/2006 | Kubo et al. |
| 7,073,067 | B2 | 7/2006 | Mizrah |
| 7,480,939 | B1 * | 1/2009 | Nessett et al. ................. 726/22 |
| 2001/0039618 | A1 | 11/2001 | Azuma |
| 2002/0029341 | A1 | 3/2002 | Juels et al. |
| 2002/0053035 | A1 | 5/2002 | Schutzer |
| 2002/0152180 | A1 | 10/2002 | Turgeon |
| 2004/0119746 | A1 | 6/2004 | Mizrah |
| 2004/0123151 | A1 | 6/2004 | Mizrah |
| 2004/0123160 | A1 | 6/2004 | Mizrah |
| 2004/0225880 | A1 | 11/2004 | Mizrah |
| 2005/0044425 | A1 | 2/2005 | Hypponen |
| 2005/0144484 | A1 | 6/2005 | Wakayama |
| 2006/0136317 | A1 | 6/2006 | Mizrah |
| 2009/0284344 | A1 * | 11/2009 | Craymer et al. ............ 340/5.54 |

FOREIGN PATENT DOCUMENTS

| | | |
|---|---|---|
| EP | 1223524 A2 | 7/2002 |
| EP | 1313027 A1 | 7/2003 |
| GB | 2313460 | 11/1997 |
| GB | 2381603 B | 8/2005 |
| WO | 0221463 A2 | 3/2002 |
| WO | 02073377 A2 | 9/2002 |
| WO | 03038569 A2 | 5/2003 |
| WO | 2004081767 A1 | 9/2004 |
| WO | 2006031212 A1 | 3/2006 |

OTHER PUBLICATIONS

H.A. Bolande, "Forget passwords, what about pictures?" WSJ Interactive Edition, Nov. 27, 2000.

R Dhamija et al., "Deja vu: A User Study Using Images for Authentication," SIMS/CS, Univ. CA Berkeley, http://paris.cs.berkeley.edu/%7Eperrig/projects/usenix2000/usenix.pdf...

W.H. Haubert III, "An Interactive Approach to Secure and Memorable Passwords," A Thesis in TCC 402 presented to the Faculty of School of Engineering and applied Science, Univ. of VA, Mar. 25, 2002, pp. 1-22.

I. Jermyn et al., "The Design and Analysis of Graphical Passwords," Proceedings of the 8th USENIX Security symposium, Washington, D.C. Aug. 23-26, 1999, 15 pp.

J. Lee, "And the Password is . . . Waterloo," New York Times, Dec. 27, 2001, 6 pp.

R. Lemos, "Passwords: The weakest Link?" CNET News.com, May 22, 2002, http://news/com.com/2009-1001-916719.html.

K.S. McCurley, "Protecting Privacy and Information Integrity of Computerized Medical Information," Sandia National Laboratories, Mar. 11, 1996, http://www.swcp.com/1mccurley/cs.sandia.gov/health/health.html.

A. Perrig et al., "Hash Visualization: a New Technique to improve Real-world Security," Computer Science Dept., Carnegie Mellon Univ., pp. 1-8, http://paris.cs.berkeley.edu/%7Eperrig/projects/validation/validation/pdf.

M. Reynolds, "Microsoft TechFest Signposts Software Futures," Gartner Dataquest Perspective, Gartner, Inc., 2002.

"Deja vu: Using Images for User Authentication," Nov. 12, 2002, http://www.realuser.com/published/ScienceBehindPassfaces.pdf.

"The Science Behind Passfaces," Sep. 2001, Real User Corporation, http://www.realuser.com/published/ScienceBehindPassfaces.pdf.

European Search Report Mailed May 26, 2010 in Application No. 07114710.2, 8 pages.

* cited by examiner

AUTHENTICATION METHOD OF RANDOM PARTIAL DIGITIZED PATH RECOGNITION WITH A CHALLENGE BUILT INTO THE PATH

BACKGROUND OF THE INVENTION

1. Field of the Invention

The invention relates generally to user authentication systems for computer and network security access control systems employing virtual reference grids of data; and more particularly authentication systems and methods based on a random partial shared secret recognition with low entropy leakage of user credentials per an authentication session and high resilience against guessing attacks.

2. Description of Related Art

Random Partial Shared Secret Recognition (RPSSR) System

A Random Partial Shared Secret Recognition (RPSSR) system is described in my prior U.S. Pat. No. 7,073,067, entitled Authentication System and Method Based Upon Random Partial Digitized Path Recognition. In a RPSSR system, the server, having obtained from a client a user name or similar credential to initiate an authentication session, presents an authentication challenge (a clue) to the client requiring client to enter a session-specific subset of a shared secret as an authentication response corresponding with the shared secret through a cognitive association. A correct authentication response to the server leads to a successful authentication event. Otherwise, the authentication process fails.

A RPSSR system is based on a One Time Authentication Challenge (OTAC) that is generated and sent from the server to the client during each authentication session, and on a One Time Authentication Response (OTAR) that is generated by the client corresponding to the OTAC through a cognitive association with a shared secret, and then sent back to the server. Security of the RPSSR authentication credential (one or more shared secrets) depends on the security of both the OTAC and OTAR components.

Credential's Combinatorial Capacity and Entropy Leakage

There are two types of attacks against "what user knows"-based authentication credentials. Attacks of the first type occur without prior collection by an intruder of a user's login information, and include guessing or computer-processing attacks at the entry devices or system "access points". Clearly, the higher the combinatorial capacity of the user credential, the less chance of success for these attacks. Also, there are system level defenses against this type of attacks described below. The second type of attacks occurs with prior collection of data combined with reengineering. Credential related information can be gathered, analyzed, and processed by an intruder over an interval including more than one user login session, gradually leading to a complete credential disclosure. This process is called an entropy leakage, because during each user authentication session being monitored, part of a shared secret "leaks" to the intruder.

Various attacks available at and/or after the credential entry event gather information due to entropy leakage. Examples of entropy leakage attack techniques include key logging software, videotaping, "shoulder surfing", brute force, etc.

Typically, entropy leakage occurs as a result of information loss at and/or after a shared secret entry event. However, there are guessing attacks which may lead to entropy leakage even without any legitimate credential entry event. These guessing attacks are especially dangerous if supported by a computer-processing power. Conventional system level protection against guessing attacks is provided by limiting the number of unsuccessful credential entry events and by limiting the login time, and causing an account lock out if the limits are exceeded.

Conventional security methods used to prevent entropy leakage, include:
- echo dots replacing entered characters
- login time and number of wrong attempts limitations leading to session termination or account lockout if exceeded
- a virtual key boards
- data encryption while in transit and the like.

An RPSSR-based authentication system provides security against entropy leakage by enabling an interactive client-server session where a user, having provided the user's name or user's ID to the server, is challenged to enter a random session-specific subset of a graphical path. An intruder, having detected just a random challenge and a random subset of a credential, would have difficulties reengineering the entire shared secret.

Nonetheless, recording challenges and respective responses of a particular user over a number of authentication sessions could provide sufficient data to a dedicated intruder to reengineer the user's credential. Therefore, it is desirable to further improve security of an authentication system based on a random partial shared secret recognition by reducing entropy leakage while doing so in a manner that remains practical for a large-scale adoption.

SUMMARY OF THE INVENTION

An interactive method for authentication of a client is described based on two shared secrets, including a first shared secret in the form of an ordered path on the frame of reference, and a second shared secret in the form of locations on the frame of reference at which a challenge identifying a random set of locations on the ordered path is to be displayed. An instance of the frame of reference comprises characters, which members of a character set such as the digits 0 to 9, arranged in a random or other irregular pattern, where each character is positioned at a location on the frame of reference. The characters used in the instance of the frame of reference are changed from session to session. There are many more locations in the frame of reference than there are characters in the character set. For example, a representative frame of reference comprises a 10 by 10 grid including 100 pre-defined locations populated using digits 0 to 9. Therefore, all or most of the characters are used more than once in every instance of the frame of reference. The arrangement can be generally characterized as characters from a character set positioned in a number N of pre-defined locations on the frame of reference, the character set including M possible characters, where 2M is less than N, so that each of the M possible characters can used in more than one of the pre-defined locations in said instance.

Authentication requires that a user enter the characters in an order specified in the challenge displayed in the displayed instance of the frame of reference found in the locations pointed to by the challenge on the ordered path. Because the characters occur more than once on the frame of reference, entry of a character reveals very little information about the first and second shared secrets. The user is able to enter the required characters by recognition of the random set on the ordered path in the first shared secret, identified by characters in second shared secret locations. Thus, a secret challenge identifying the random set of locations on the ordered path is embedded within the displayed instance of the graphical representation of the frame of reference.

An ordered path on the frame of reference includes a plurality of pre-defined locations on the frame of reference having an order. A secret challenge, embedded within the graphical representation of the frame of reference, identifies a set of the plurality of pre-defined locations on the ordered path. The set of locations pointed to by the challenge may consist of fewer locations than there are on the ordered path, the same number of locations, or a larger number of locations. Locations on the ordered path may be used more than once in the challenge. The ordered path and the locations of characters of the secret challenge on the frame of reference are set out in advance as shared secrets between the client and the authentication server.

In an embodiment described herein, the secret challenge comprises characters at a pre-defined subset of the plurality of pre-defined locations along the full ordered path, and is therefore embedded in the full path. For one example which is described herein, the full ordered path includes 10 locations on a frame of reference consisting of a 10×10 grid of locations. An instance of a graphical representation of the 10×10 grid is presented to the client with characters positioned at the locations on the grid. The secret challenge in this example comprises characters at the first six locations of the 10 locations along the ordered path. Of course, other types and sizes of frame of reference can be utilized with the technology described herein.

Because the client knows that the secret challenge can be found in the instance of the frame of reference, such as at a pre-defined subset of the locations on the ordered path, the client is able to enter an authentication response. However, the secret authentication challenge is veiled within the graphical representation of the frame of reference, limiting entropy leakage using the technology. Because intruders will not know the plurality of pre-defined locations at which the characters of the challenge are positioned, information about the secret credentials is difficult to discover and entropy leakage is therefore reduced. An embodiment of the system described herein is referred to as a random partial digitized path recognition system with a secret challenge (RPDPR-SC).

An authentication server is described which embodies the authentication techniques described above. In addition, the technology herein implemented using computer software can be embodied by a machine readable data storage medium.

Other aspects and advantages of the technology described herein are set out below in the drawings and the detailed description which follows.

BRIEF DESCRIPTION OF THE DRAWINGS

FIG. 4 illustrates a frame of reference.

FIGS. F5A-1 to 5E-1 provide various examples depicted by arrows with continuous paths having ten field positions along the path for online user account set up in support of the RPDPR-SC authentication process during the login sessions according to the present invention.

Figure 2:
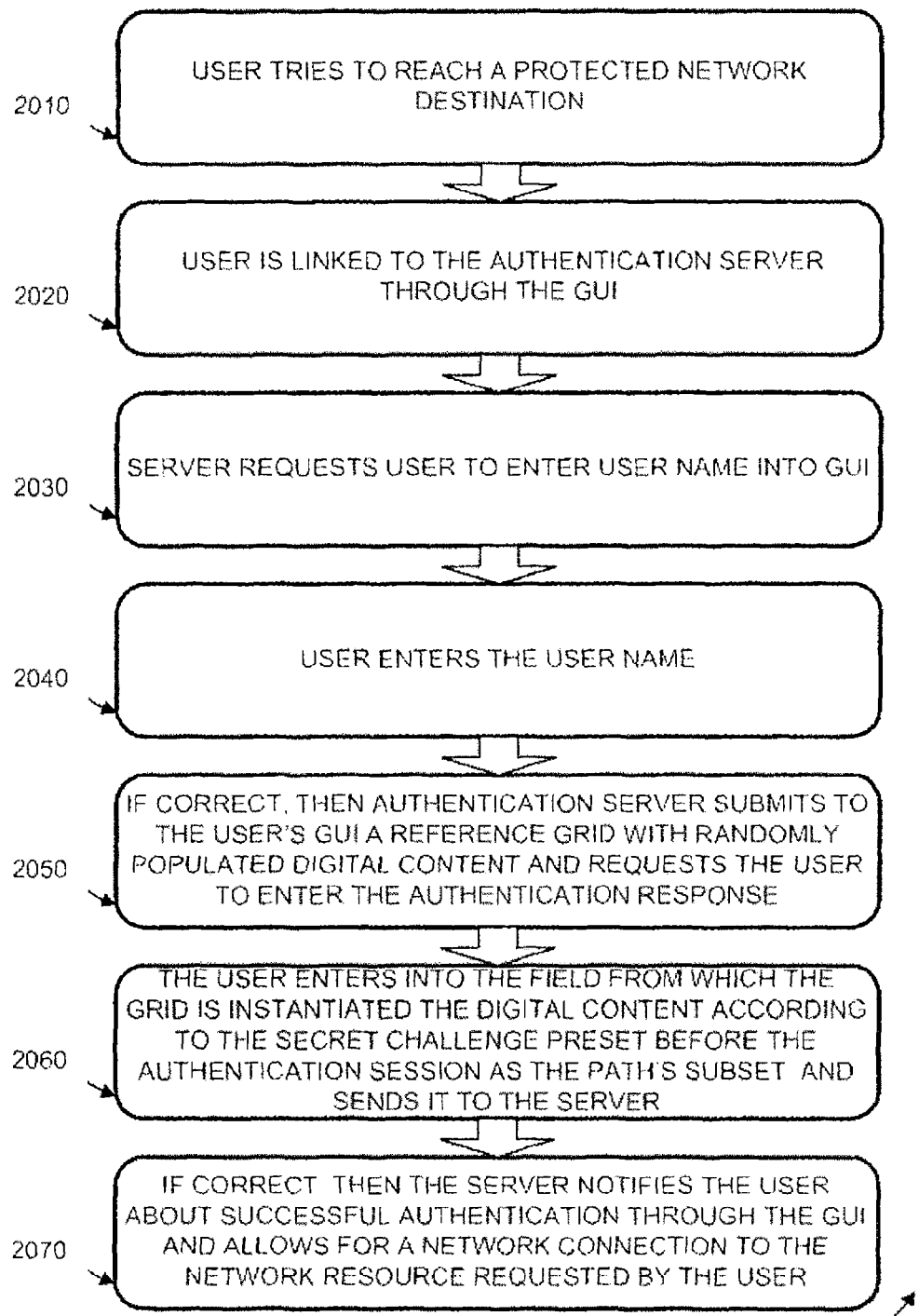
FIG. 2 is a flowchart of the basic Random Partial Digitized Path Recognition (RPDPR) algorithm which is enhanced and modified with a Secret Challenge built into the full graphical ordered path as the path's subset, and constituting altogether RPDPR-SC authentication session according to the present invention.
Figures 4, 5A-1, 5B-1, 5C-1, 5D-1, 5E-1:
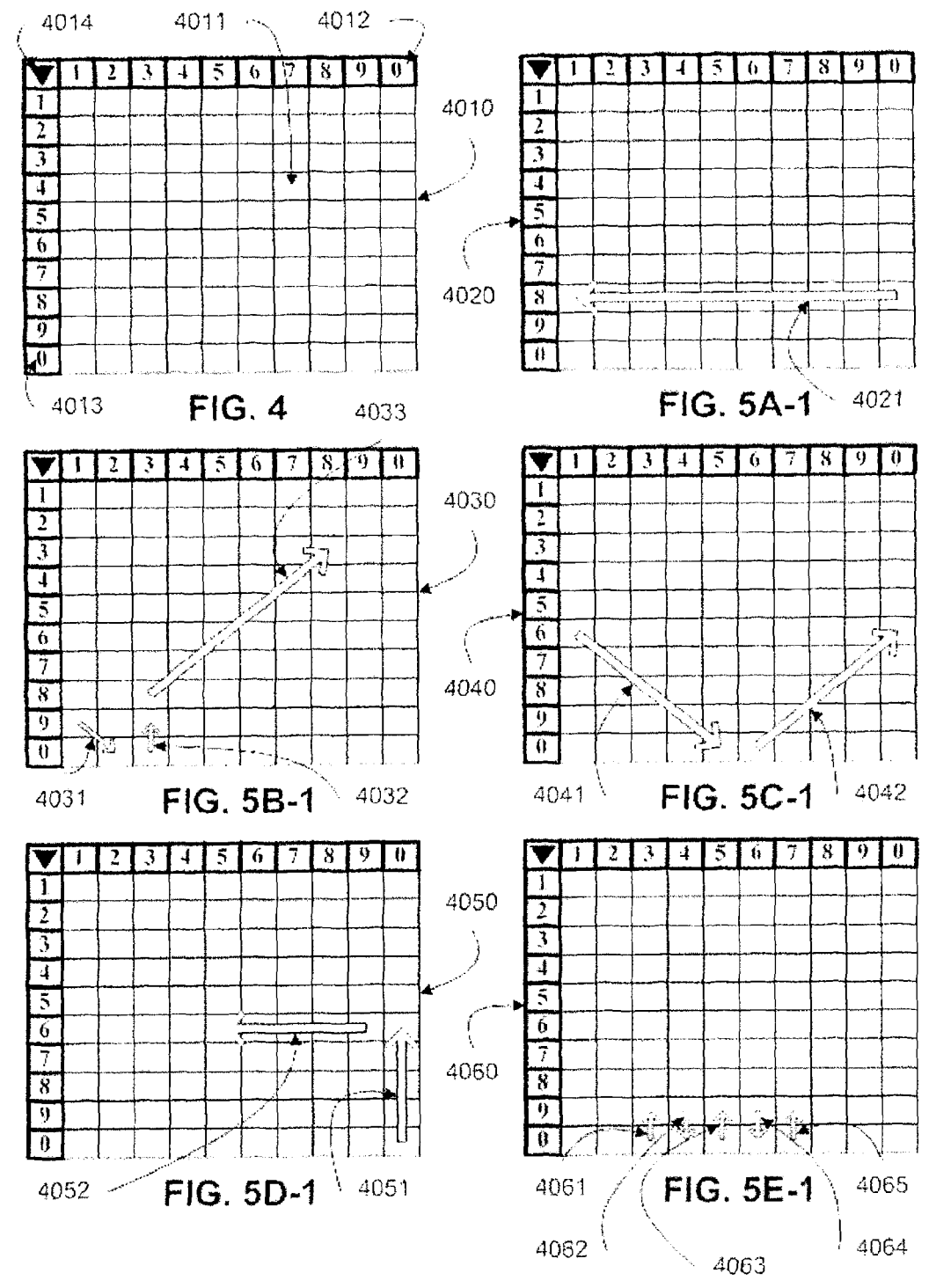
Figures 5A-2, 5B-2, 5C-2, 5D-2, 5E-2:
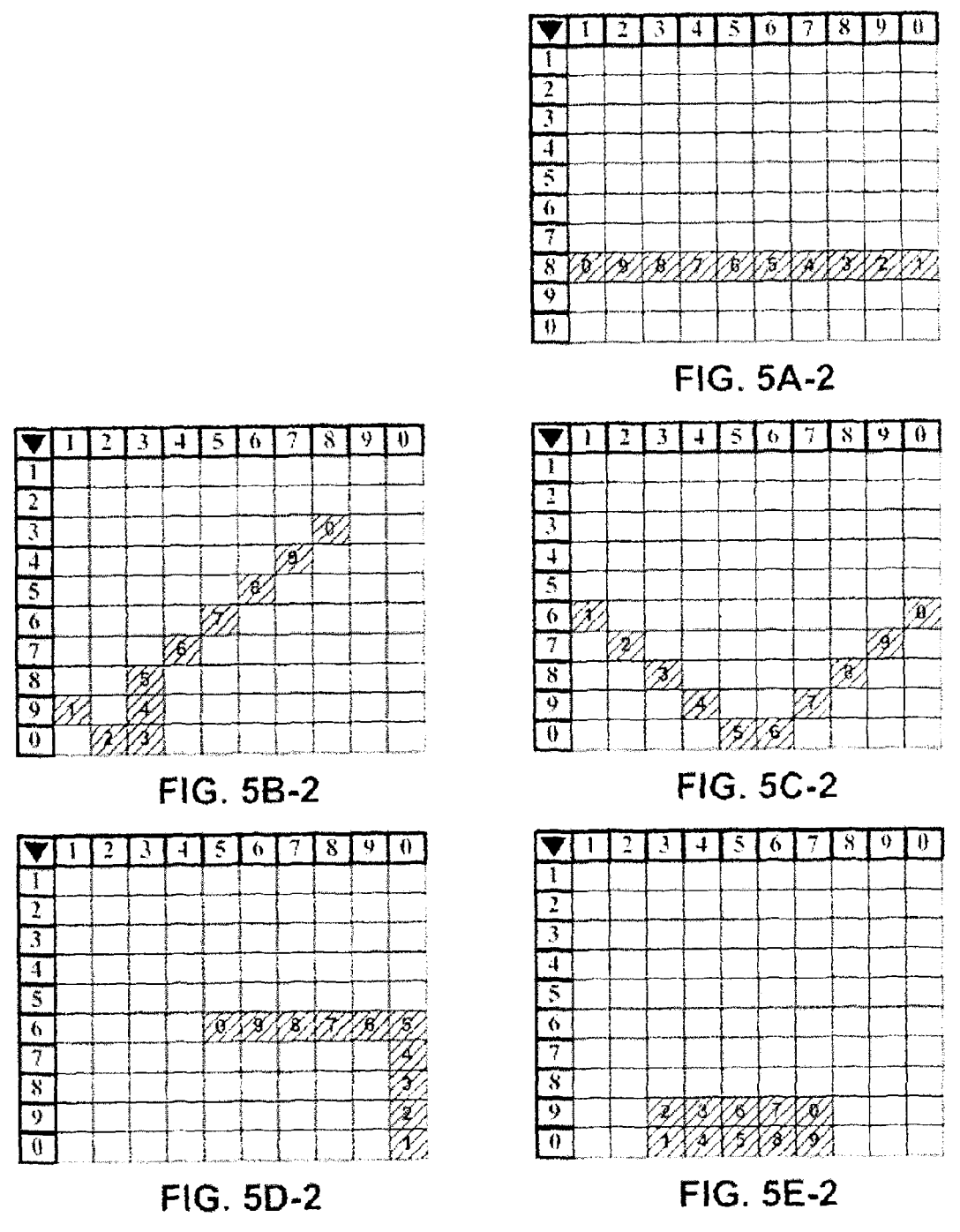

FIGS. 5A-2-5E-2 provide a secret graphical ordered path selection grid and various examples depicted by digits and shadowed grid fields with continuous paths having ten field positions for online user account set up in support of the RPDPR-SC authentication process during the login sessions according to the present invention.

Figure 1:
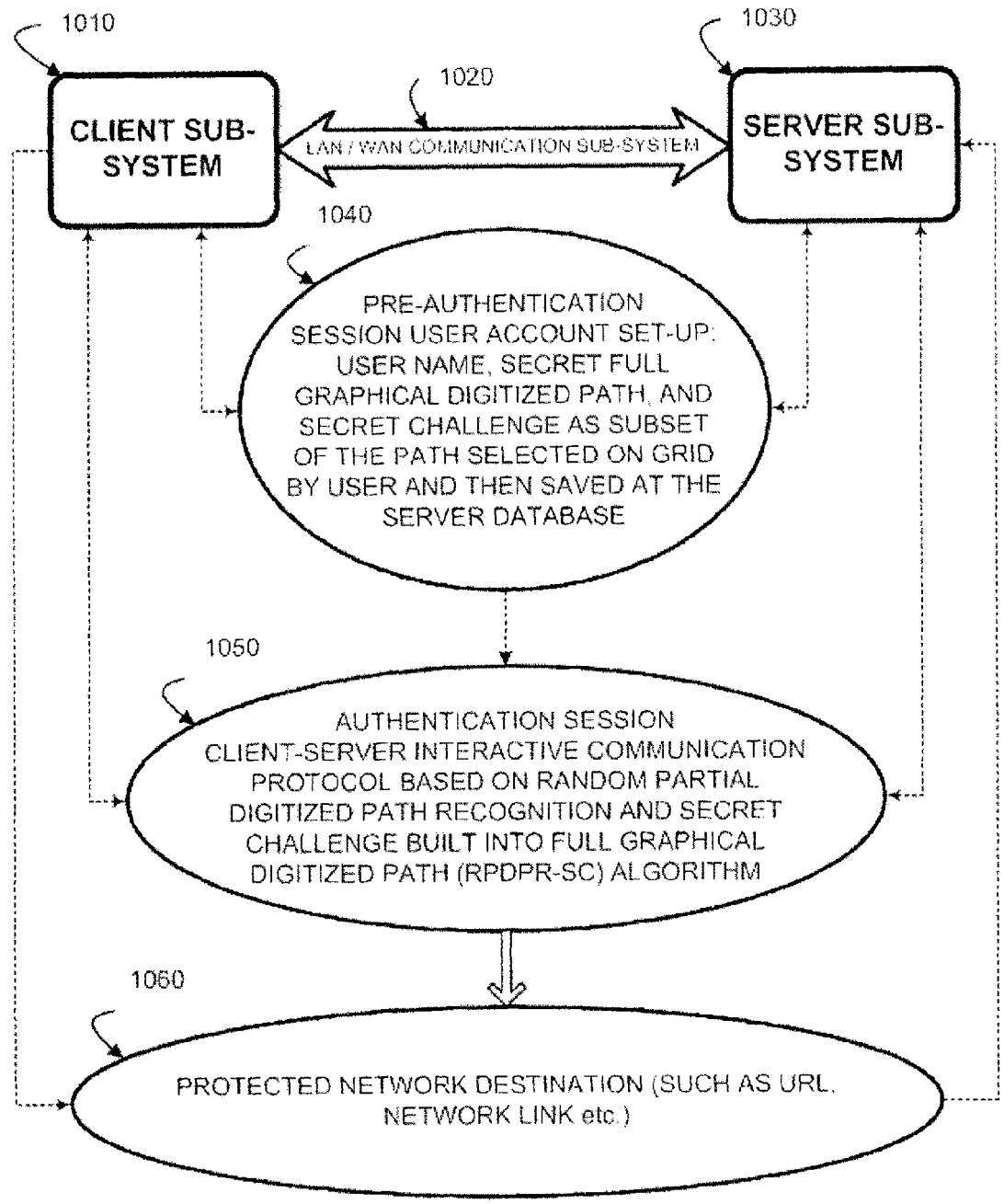
FIG. 1 illustrates a basic communication set up for an authentication processes according to the present invention.
Figures 1, 6A:
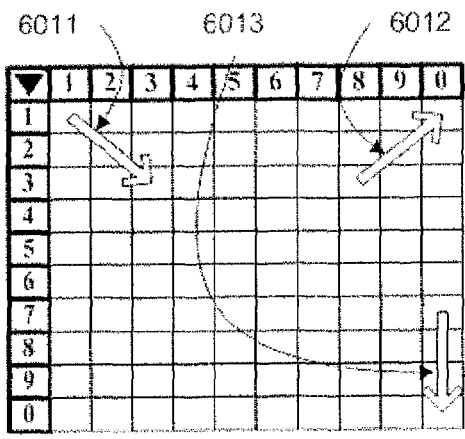
Figures 1, 6B:
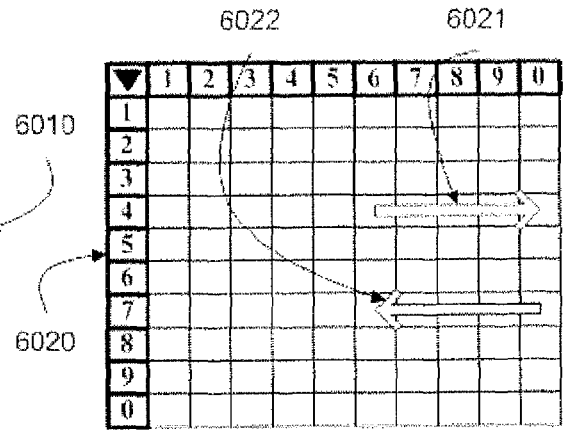
Figures 1, 6C:
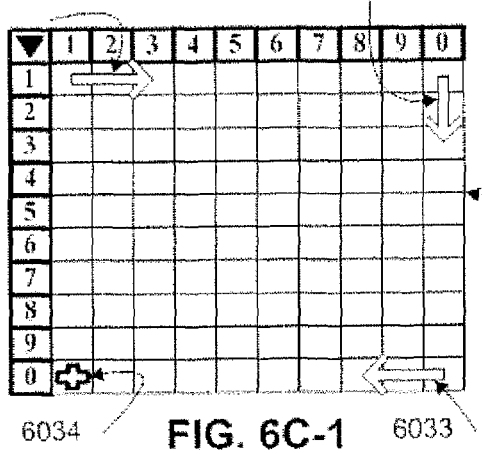
Figures 1, 6D:
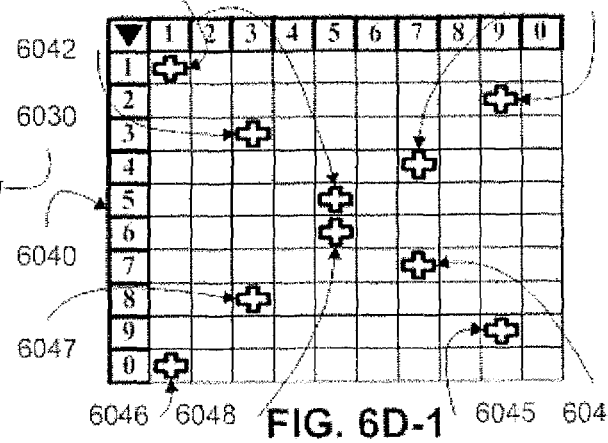
Figures 1, 6E:
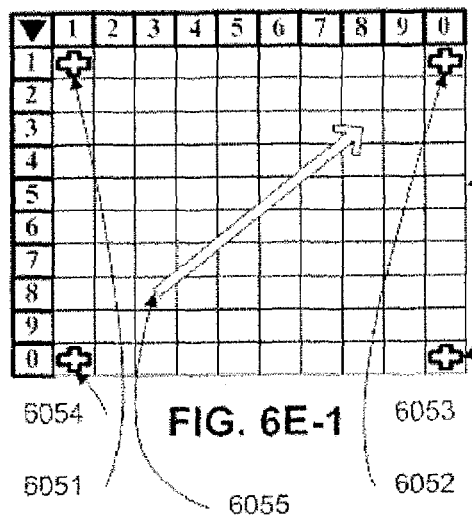
Figures 1, 6F:
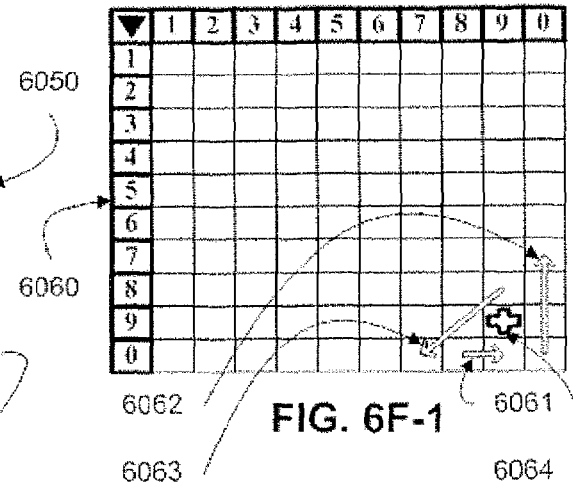

FIGS. 6A-1 to 6F-1 provide various examples depicted by arrows with graphical non-continuous paths having ten field positions for online user account set up in support of the RPDPR-SC authentication process during the login sessions according to the present invention.

FIGS. 6A-2 to 6F-2 provide various examples of graphical non-continuous paths having ten field positions depicted by digits and shadowed grid fields for online user account setup in support of the RPDPR-SC authentication process during the login sessions according to the present invention.

Figure 7A:
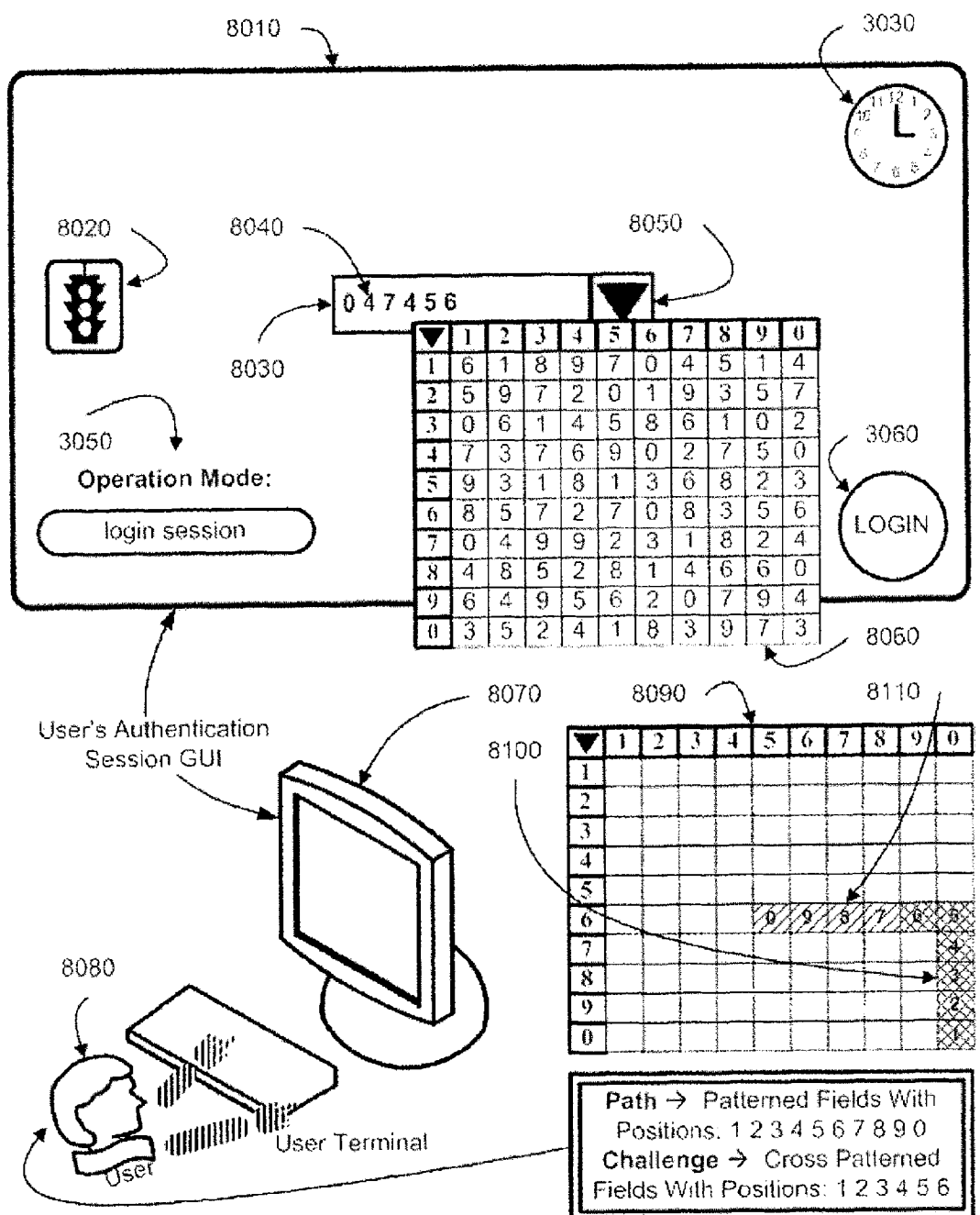

FIG. 7A illustrates a graphical user interface in a desktop or laptop's browser or on a screen supporting the login process at the random partial ordered path data content entry state at one grid instantiation, with the data content pointed by a secret challenge built into the full graphical continuous ordered path, used in one example of an authentication program according to the present invention.

Figure 7B:
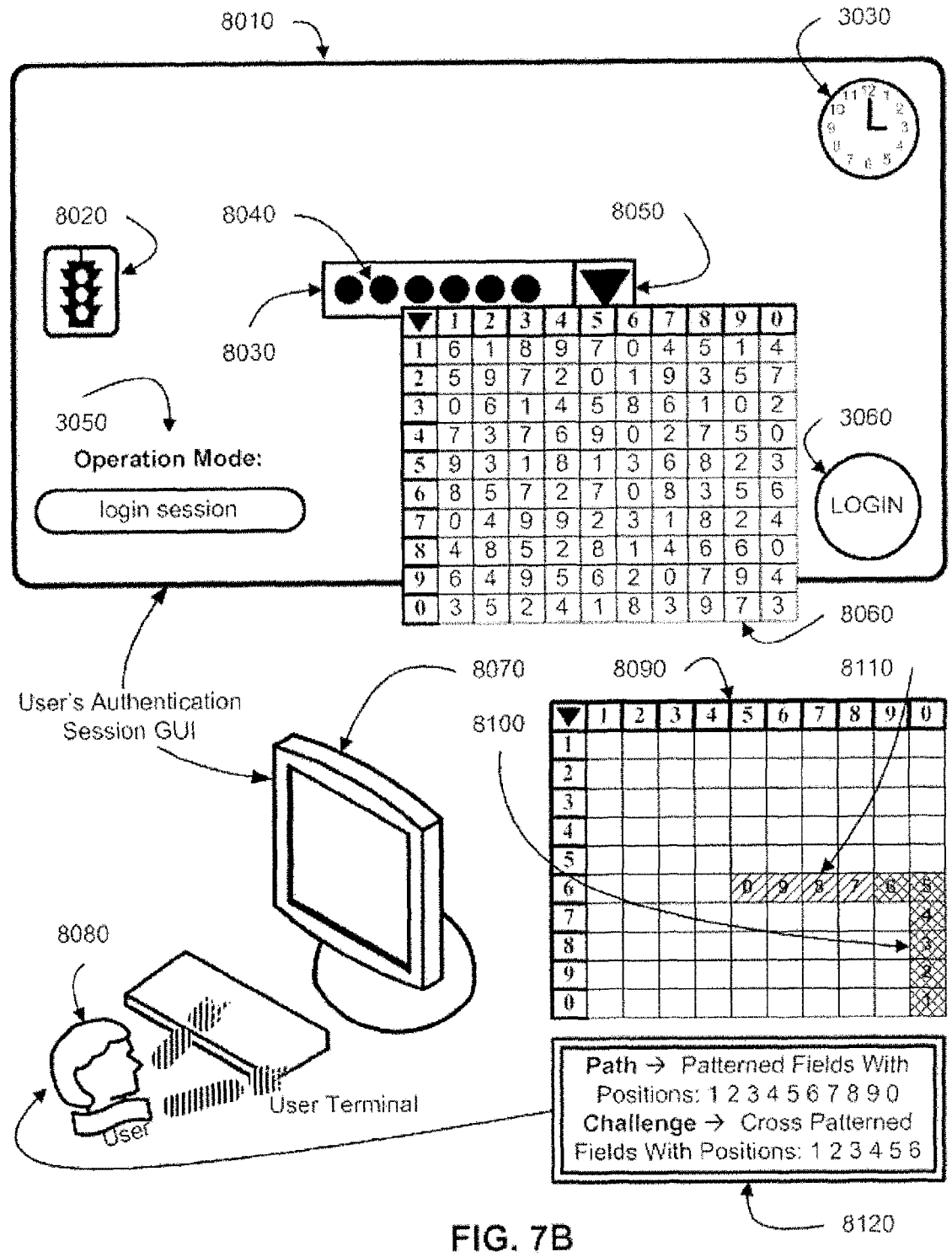

FIG. 7B illustrates a graphical user interface in a desktop or laptop's browser or on a screen supporting the login process at the random partial ordered path data content entry state at one grid instantiation, with data content pointed by a secret challenge built into the full graphical continuous ordered path and entered into the data field as echo dots, used in one example of an authentication program according to the present invention.

Figure 7C:
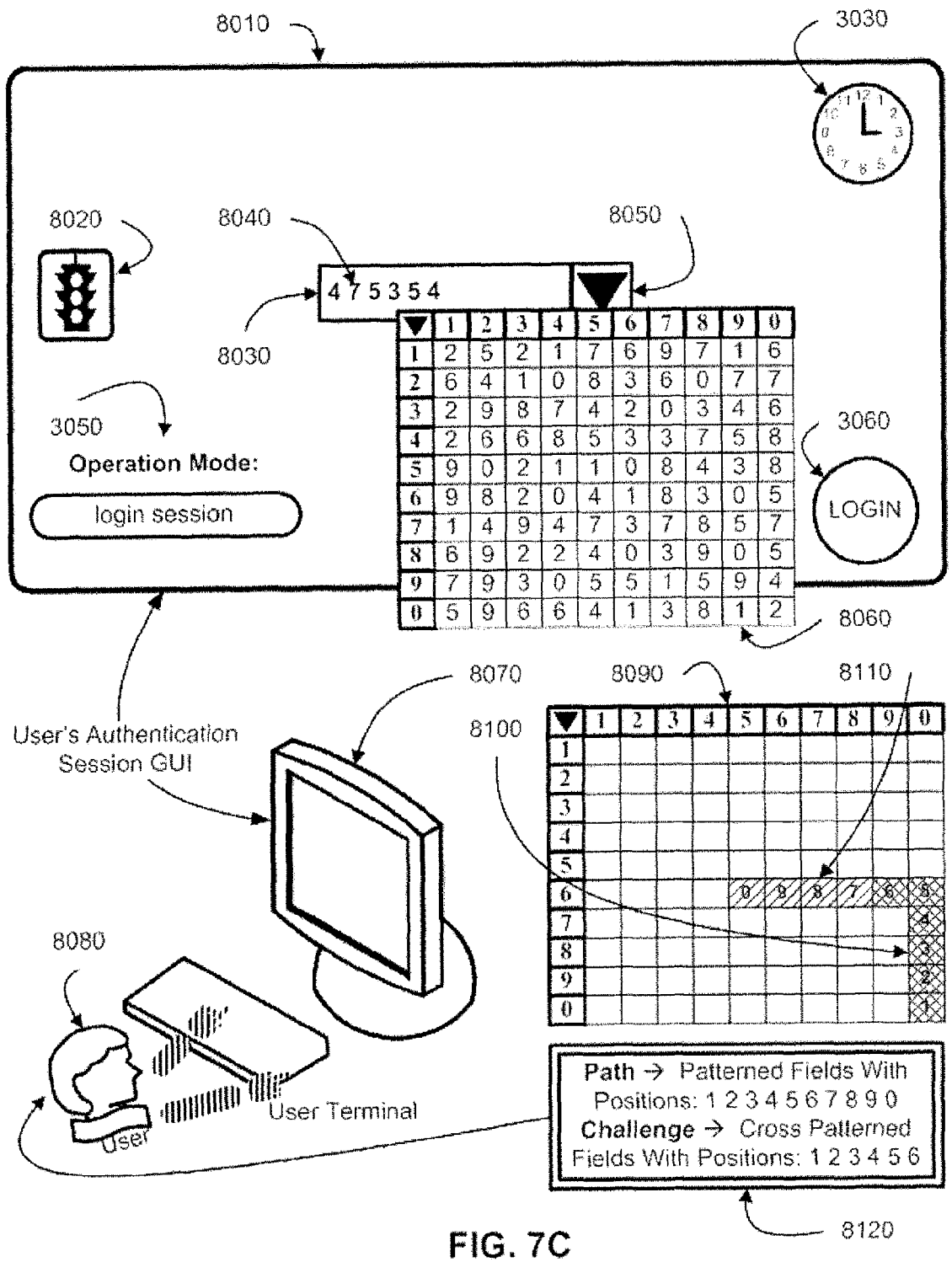

FIG. 7C illustrates a graphical user interface in a desktop or laptop's browser or on a screen supporting the login process at the random partial ordered path data content entry state at another grid instantiation, with the data content pointed by the secret challenge built into the full graphical continuous ordered path, used in one example of an authentication program according to the present invention.

Figure 8A:
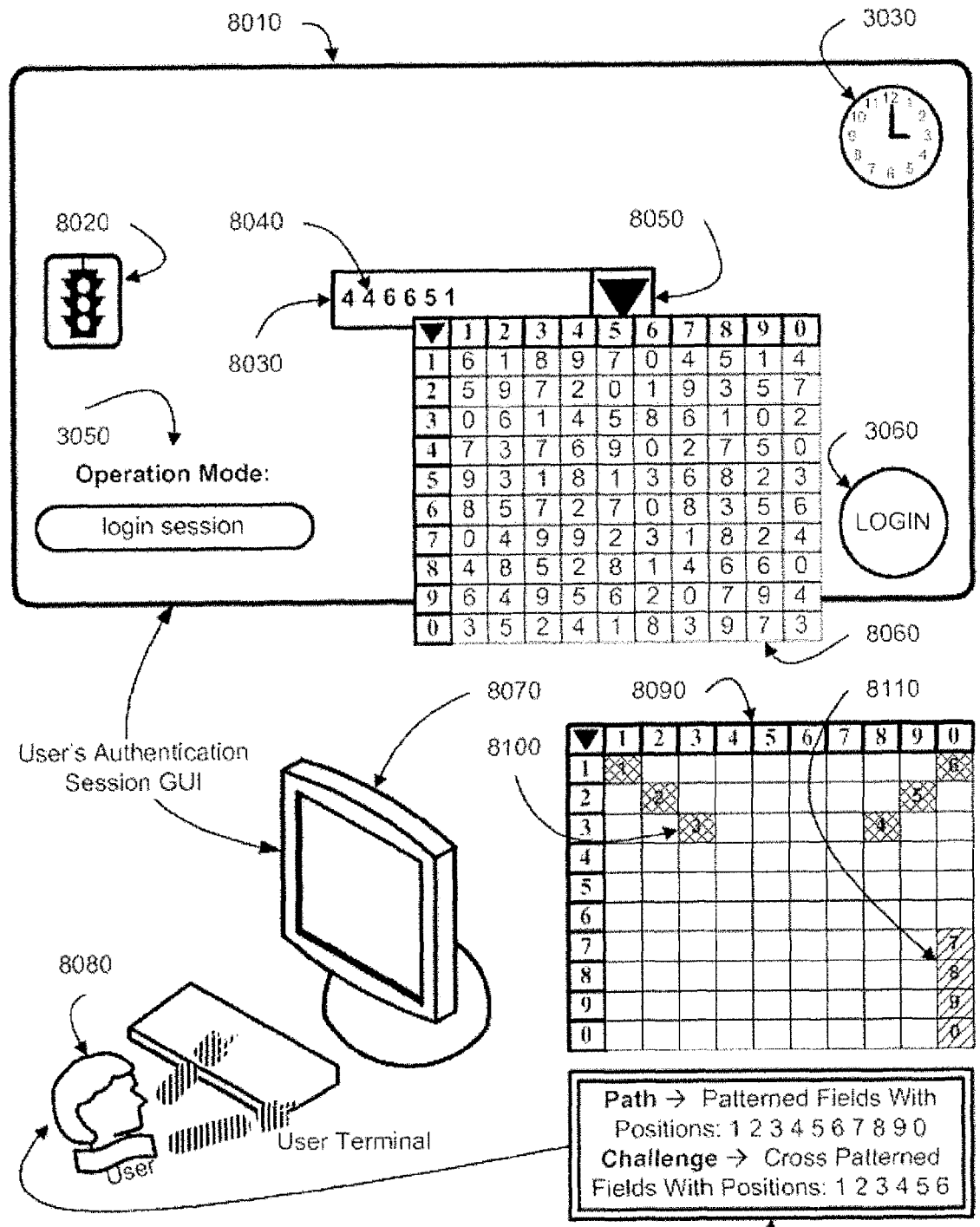

FIG. 8A illustrates a graphical user interface in a desktop or laptop's browser or on a screen supporting the login process at the random partial ordered path data content entry state at one grid instantiation, with the data content pointed by a secret challenge built into the full graphical non-continuous ordered path, used in one example of an authentication program according to the present invention.

Figure 8B:
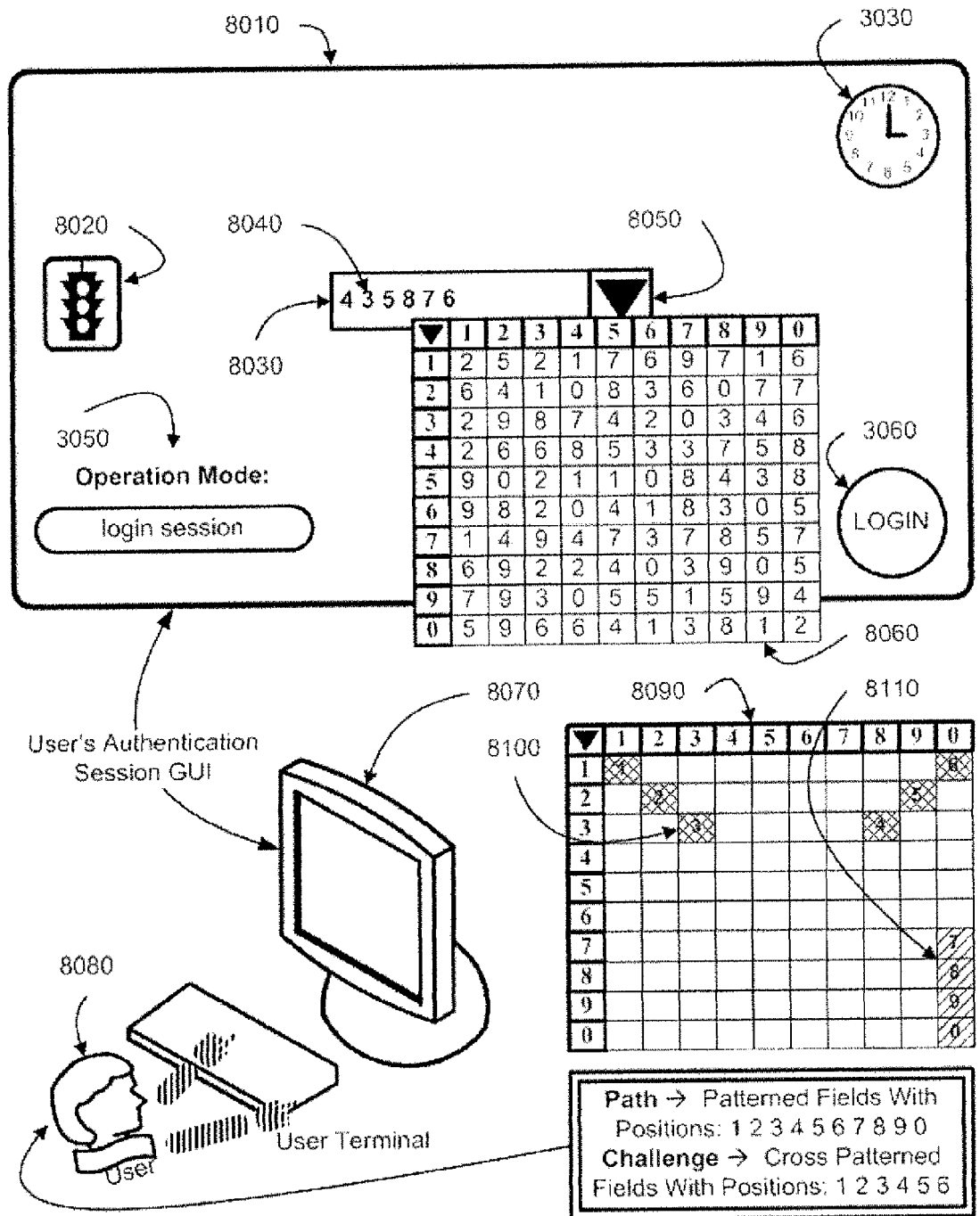

FIG. 8B illustrates a graphical user interface in a desktop or laptop's browser or on a screen supporting the login process at the random partial ordered path data content entry state at another grid instantiation, with the data content pointed by the secret challenge built into the full graphical non-continuous ordered path, used in one example of an authentication program according to the present invention.

Figure 9:
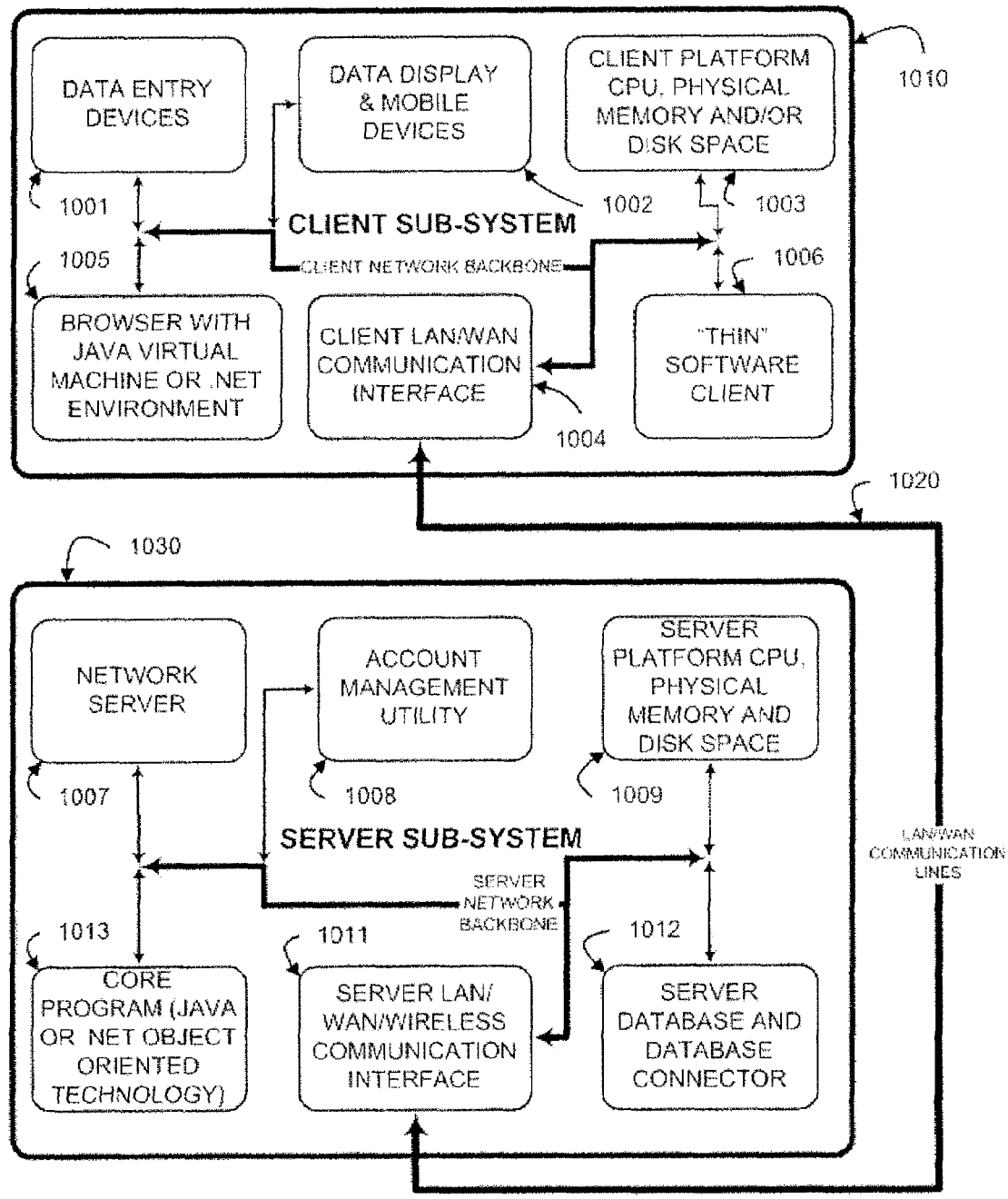

FIG. 9 is a basic architecture diagram for an embodiment of a client-server system according to the present invention, including support for the RPDPR-SC authentication process utilizing one communication channel (like an Internet browser) for interactive client-server authentication session.

DETAILED DESCRIPTION

A detailed description of the embodiments of the present invention is provided with reference to FIGS. 1 through 9.

RPDPR-SC Authentication Factor Basic Data Flow Communication Set Up

FIG. 1 illustrates client-server architecture for implementation of a user authentication process based on a Random Partial Digitized Path Recognition (RPDPR) algorithm which is enhanced and modified with a Secret Challenge, and constituting altogether RPDPR-SC algorithm according to the present invention. The Secret Challenge is built into the full graphical ordered path as explained below. Basically, a client subsystem 1010 communicates by communications subsystem 1020, including communication media, such as a local area network or a wide area network, with a server subsystem 1030 by sending data communications. A protected network destination 1060 controls access to resources such as secure web sites identified by URLs, links to secure networks, and the like.

To set up access, a pre-authentication session 1040 is executed by the client subsystem 1010 and the server subsystem 1030. In the pre-authentication session 1040, a user account is set up in the server subsystem 1030 including a data set associated with each client including first and second shared secrets and a client identifier. The user name and the first shared secret in the form of a graphical ordered path (referred to as the full ordered path) is selected by the user and stored in server subsystem 1030. The full ordered path is represented by a data structure including an ordered set of data fields associated with the data set for the client stored in the server subsystem. In the ordered set of data fields, the data fields have a position in the set (according to the order) and have respective field contents. For the RPDPR-SC system being described, the field contents include coordinates of a first plurality of pre-defined locations on a frame of reference characterizing a directed, ordered path on the frame of reference. The position in the data set corresponds to a location on the directed, ordered path, identified by coordinates on the frame of reference. The position in the data set therefore indicates to the client who knows the first shared secret, coordinates on the frame of reference of locations on the full ordered path.

Also, as a part of the pre-authentication session 1040, the user chooses in addition to the shared full path, a second shared secret comprising an ordered set of coordinates of a second plurality of pre-defined locations on the frame of reference to be used for a secret authentication challenge. In an embodiment described herein, the second plurality of pre-defined locations defines sub-path that consists of a subset of a full path. The sub-path is used to carry an authentication challenge that is built into a displayed instance of the frame of reference, by positioning characters at locations in the sub-path pointing to or suggesting the partial subset of the full path and can be referred to as a built-into-the-path challenge. Though any combination of locations on the frame of reference can be chosen as the second shared secret for use in forming a built-into-the-graphical interface challenge, the embodiment being described is a sub-path coinciding with the full graphical ordered path (for an easy cognitive associa-tion) but shorter (in other words, having fewer locations on the frame of reference) than the full graphical ordered path. The number of locations in the second shared secret defines the combinatorial capacity of the authentication challenge and influences the security of the RPDPR-SC authentication factor. Therefore, a certain minimum number of locations in the second shared secret can be mandated by the system administrator with online account set Up policies. Thus, in one preferred RPDPR-SC embodiment, the user account information, user name and ordered set of data fields (identifying the locations on the full path) along with a subset of ordered set of data fields (identifying the locations on the sub-path) for carrying the authentication challenge are stored in a secure server database, along with such other information needed or desirable for utilization during an authentication session. In some embodiments, information supporting additional authentication factors is stored in the database.

To gain access to protected network destination 1060, client subsystem 1010 and server subsystem 1030 execute authentication session 1050 that includes a client-server interactive communication protocol based on RPDPR-SC. A more detailed description of the embodiment of authentication session 1050 is provided with reference to FIG. 2.

RPDPR-SC Authentication Protocol

According to one basic flow, an authentication session is initiated when the user tries to reach a protected network destination (block 2010). The protected network destination redirects the attempted access by sending a data communication to the authentication server, or the attempted access is otherwise detected as a data communication at the authentication server 1030. In one example where the user is attempting access using an Internet browser, a communication interface is returned to the user's browser using data communications according to a protocol like HTTP, where the interface includes a graphical user interface and links to authentication server 1030 (block 2020). The communication interface may be returned through redirection, for example, by the authentication server or another network resource. Through the graphical user interface, the server prompts the user to enter a user name into a field in the graphical user interface (block 2030). The user enters the user name, which is returned by a data communication to the authentication server (block 2040). If the user name is valid, then the authentication server composes an instance of a graphical representation of the frame of reference with characters positioned at the pre-defined locations on the frame of reference in a manner that is randomized or otherwise intended to be unique to the current authentication session. Within the graphical representation, a one time authentication challenge OTAC is presented, by populating locations on the second plurality of pre-defined locations identified by the second shared secret, with characters that identify for example a subset of the full path, along with an express or implied request to enter a one time authentication response OTAR (block 2050). The OTAR consists of characters in order, found in the locations pointed to by the characters positioned in the subset of the full path. The OTAC is veiled by the characters in the frame of reference, which includes many more locations than there are characters in the character set used to populate the frame of reference, so that there can be more than one instance of each character. Typically, each instance of the graphical representation of the frame of reference will include many instances of each character in the character set. However, for some algorithms used for composing the graphical representation, such as randomly populating the field, it is possible a particular character in the characters set appears only once or not at all. In any event, the locations of the challenge are not apparent to an intruder. Furthermore, entry of characters for the OTAR does not identify positions on the full path, because each character is normally positioned in more than one location on the frame of reference.

For instance, in one embodiment and for one particular authentication session, an instance of a graphical representation of the frame of reference consists of a 10 by 10 grid of locations, where a random character (where the characters are digits, letters or other characters that can be used to suggest an order) is positioned at each location in the grid. For a particular instance of the grid, the character positioned at each location is session specific, so that the instance is used for only one authentication session. In a representative example, consider a full path including ten data fields storing coordinates of ten locations on the frame of reference, with the starting location for the full path in position 1 and a random character being the digit 3, next consecutive location in position 2 and a random character being the digit 8, next consecutive location in position 3 and a random character being the digit 5, next consecutive location in position 4 and a random character being the digit 2, next consecutive location in position 5 and a random character being the digit 7, next consecutive location in position 6 and a random character being the digit 9, next consecutive location in position 7 and a random character being the digit 8, next consecutive location in position 8 and a random character being the digit 1, next consecutive location in position 9 and a random character being the digit 4, and the last location at the full graphical ordered path in position 10 which is presented with digit 0 and a random character being the digit 6. Hence, the full ordered path is presented in this example as the following sequence of characters in the predefined locations along the secret full ordered path: "3, 8, 5, 2, 7, 9, 8, 1, 4, 6". Assume for this example that the second shared secret consists of coordinates of the first six locations along the full path. Then, according to the example above, the one time authentication challenge OTAC consists of the six characters displayed at the locations corresponding to the sub-path on the instance of the grid. The OTAC therefore includes the character in position 1—equal to 3, the character in position 2—equal to 8, the character in position 3—equal to 5, the character in position 4—equal to 2, the character in position 5—equal to 7, and the character in position 6—equal to 9. Thus, a secret OTAC (3, 8, 5, 2, 7, 9) is built into the secret full path on the session specific instance of the grid.

The user is prompted to enter characters into the data entry field on the graphical user interface according to the OTAC to be returned by data communication to the servers as the OTAR. In this particular example, the first character of the challenge points to field position 3 along the path, where the displayed random character is the digit 5. Hence, the user enters 5 into the data entry field by either using a keyboard, or clicking on any field on the grid having the session-only random digital content equal to 5. Then, the second character of the challenge points to field position 8 along the path, where the displayed random character is the digit 1. Hence, the user enters 1 into the data entry field. Going the same way across remaining points in the sub-path 3, 4, 5, and 6, one can derive a random session-only one time authentication response OTAR "5 1 7 8 8 4". The user completes entering input field values that correspond to this OTAR using the graphical user interface and sends the OTAR to the authentication server (block 2060). If the input data matches the field content derived at the server for the very same path, challenge and the random session-only characters in the array, then successful authentication is signaled. The successful authentication signal is sent to the user via, for example the graphical user interface, to the protected network destination and/or to other resources (such as authorization and accounting systems) that need to know that the authentication session has succeeded. Ultimately, network connection to the protected network destination requested by the client is allowed (block 2070).

Despite the use of a static shape and direction for the full path on a grid as a client-server first shared secret and the use of a static shape and direction for the sub-path as a second shared secret for an authentication challenge, the characters displayed in the respective fields in the grid are session-only and random, being generated by server 1030 for one authentication session only and for one instance of the graphical representation of the grid. If the user commits an act or omission that closes the graphical representation of the grid, without entering an OTAR, server 1030 is notified. If the authentication session is continued, the server 1030 generates and sends to the client during the same authentication session another random session-only instance of the grid with different random content. So, with each subsequent grid instantiation by the user, new session specific content is provided.

Graphical User Interface for RPDPR-SC Authentication Factor

Figure 3A:
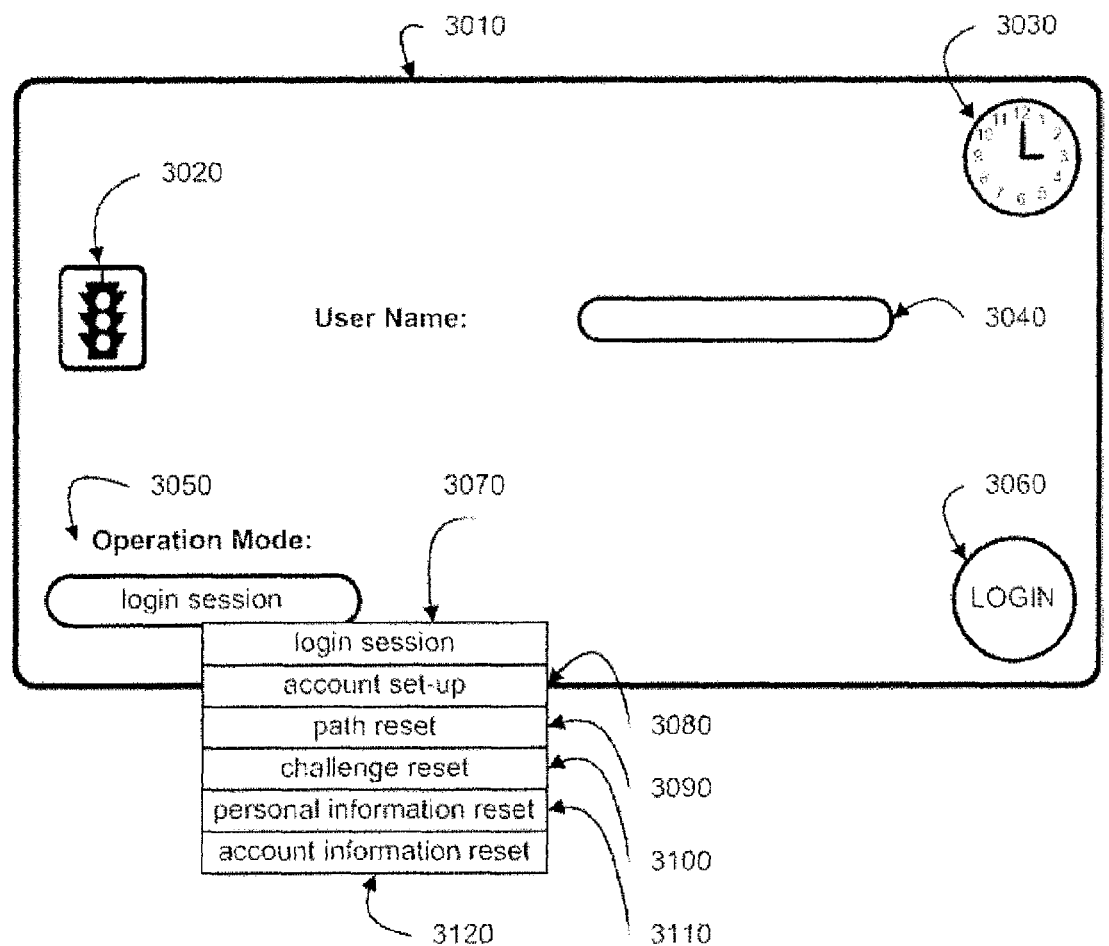
FIG. 3A illustrates a graphical user interface in a desktop or laptop's browser or on a screen supporting the variety of RPDPR-SC operation modes, and particularly, the operation mode menu entry selection process, and the login process at the user name entry state used in one example of an authentication program according to the present invention.
Figure 3B:
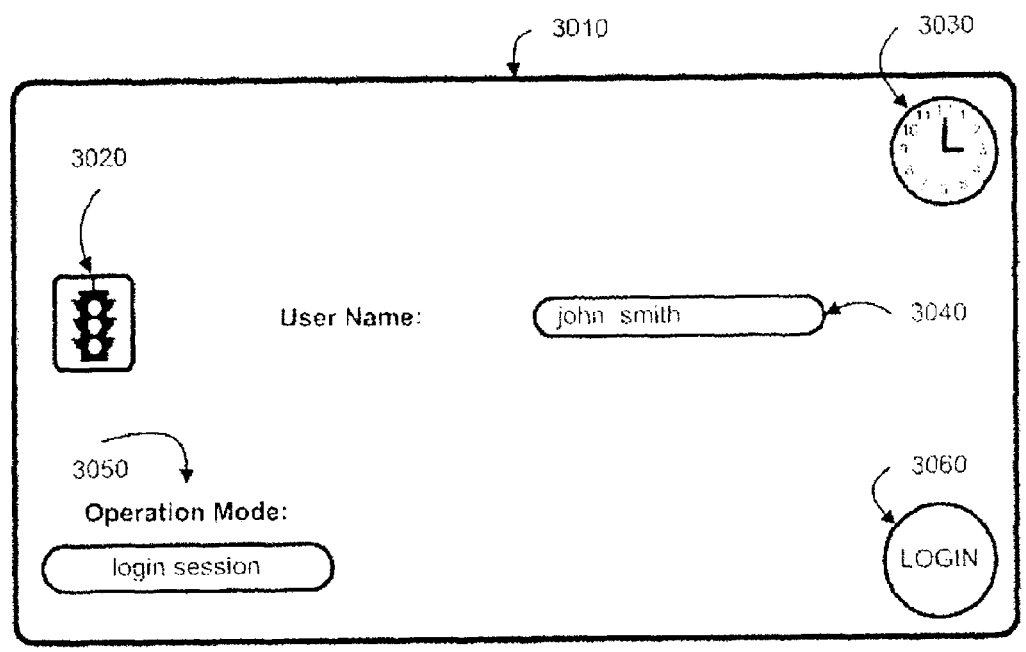
FIG. 3B illustrates a graphical user interface, in a desktop or laptop's browser or on a screen, supporting the variety of RPDPR-SC operation modes, and particularly, the login process at the user name entry state used in one example of an authentication program according to the present invention.
Figure 3C:
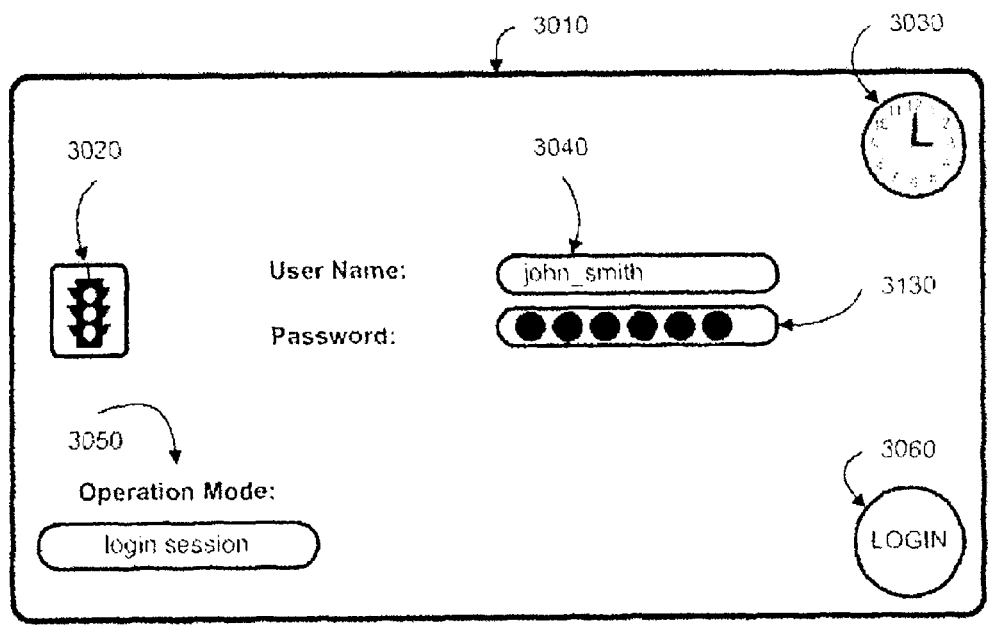
FIG. 3C illustrates a graphical user interface in a desktop or laptop's browser or on a screen supporting the variety of RPDPR-SC operation modes, and particularly, the login process at the user name and password entry state used in one example of an authentication program according to the present invention.

FIGS. 3A, 3B, and 3C illustrate input constructs based on graphical user interfaces presented using Web browsers for a login and authentication session. FIG. 3A illustrates an opening screen 3010 which is presented to the user at the beginning of an RPDPR-SC authentication session. In the opening screen 3010, data entry field 3040 is used for entry of a user name. Login button 3060 is indicated to initiate processing of field data and to start a login process.

Operation mode menu 3050 is included and when it is indicated, it causes a drop-down menu of operation mode buttons including login session operation mode button 3070, account set up operation mode button 3080, path reset operation mode button 3090, authentication challenge built into the path reset operation mode button 3100, user personal information (a set of personalized security questions not disclosing user's personally identifiable information) reset button 3110, and user account information reset button 3120. Stoplight icon 3030 is included in screen 3010. Stoplight icon 3020 is red before the user name is entered (either by indicating LOGIN button 3060, or hitting the "Enter" key on the user's keyboard), is yellow during client-server communications while the client is waiting for verification of the user name, and turns green when user name is accepted. Also included in screen 3010 is session timer icon 3030 indicating session elapsed time for the login session. The system administrator can set parameters in the server that terminate the login process or any other selected by user operation mode session in menu 3050. If the timer expires (session time can have different time limits for various operation modes), or otherwise react to timer expiry. FIG. 3B and FIG. 3C illustrate the interface of FIG. 3A, where the mode button has been used to select a RPDPR-SC login session. FIG. 3B shows the interface for entry of a user name only. FIG. 3C illustrates an embodiment in which a two-factor authentication (strong authentication) scheme is used, including a password (or PIN) as the first authentication factor. In FIG. 3C, fields for entry of a User Name and a Password (or PIN) are provided on the GUI. The RPDPR-SC process discussed above is used as a second authentication factor.

Selecting a Full Graphical Ordered Path on a Grid at User Account Set Up

FIG. 4 and FIGS. 5A-1 to 5E-1, when related to FIGS. 5A-2 to 5E-2, and FIGS. 6A-1 to 6F-1, when related to FIGS.

6A-2 to 6F-2, illustrate how an ordered path is specified with respect to a frame of reference for use as a RPDPR-SC authentication factor. In this example, the frame of reference consists of a reference grid as shown in FIG. 4. Reference grid 4010 in this embodiment consists of an array of pre-defined locations (e.g. 4011) that can be characterized by coordinates along horizontal and vertical axes 4012, 4013 respectively, as in a Cartesian coordinate system. Other frames of reference may be organized according to other coordinate systems, such as polar coordinate systems, three dimensional coordinate systems, and so on. In the example shown in FIG. 4, location 4011 can be characterized by coordinates (7, 4). FIG. 4 represents an instance of a frame of reference in which the locations on the grid are not populated with characters, for display on a user interface during an account setup procedure, for example, and used by a client to specify a full graphical ordered path. Thus, the instance includes icon 4014 with a black triangle (or more preferably a triangle that is highlighted in some form, such as by being colored red) depicted on it at the intersection of the reference axes, used as a button for opening and closing the instance. The client may draw (or choose, or select) a graphical path on the reference grid with a mouse, a keyboard, or other input device, or the graphical path may be provided by a server, as suits a particular instance of the set up algorithm.

FIGS. 5A-1 to 5E-1, illustrate representative graphical ordered paths which can be set up using the frame of reference 4010. Related FIGS. 5A-2 to 5E-2 disclose the meaning of word "ordered" as an adjective for "graphical path" as used herein. Shaded grid locations consecutively numbered with digits 1, 2, 3, 4, 5, 6, 7, 8, 9, 0 from the beginning to the end of the graphical path comprise full graphical ordered paths. Any subset of this path's fields can be selected as a sub-path representing an authentication challenge built into the path. The number of a field represents the field position in the order along a full graphical ordered path. Thus, FIG. 5A-1 and its related figure, FIG. 5A-2, illustrate graphical path 4021 on an instance 4020 of the reference grid. The path includes a set of locations beginning with a location at coordinates (0, 8). The path proceeds in a straight line in order with locations at the coordinates (9, 8), (8, 8), (7, 8), . . . , (1, 8). A data set corresponding with this ordered path comprises a set of data fields having positions 1 through 0 (here and everywhere in this application 0 represents position number 10) in the data set (where the positions can be represented by a field number using a data set that comprises a linear array of data fields). The data fields at the 10 positions respectively store combinations of coordinates (0, 8) through (1, 8) in order. In this manner, if the client knows the path and the location of a data field in the data set, the client can determine the coordinates stored in the data field. Those coordinates can be used to fulfill the authentication factor as described below.

FIG. 5B-1 and its related figure, FIG. 5B-2, illustrate a graphical path represented by arrows 4031, 4032, 4033 on an instance 4030 of the frame of reference. The graphical path of FIG. 5B-1 and its position number representation in FIG. 5B-2 include the coordinates in order: (1,9), (2,0), (3,0), (3,9), (3,8), (4,7), (5,6), (6,5), (7,4), and (8,3). These coordinates are stored in the data fields in positions 1 through 0 respectively (see FIG. 5B-2) in the data set used as the authentication factor based on the path in FIG. 5B-1.

FIG. 5C-1 and its related figure, FIG. 5C-2, illustrate a path represented by arrows 4041, 4042 on an instance 4040 of the frame of reference. The graphical path of FIG. 5C-1 and its related figure, FIG. 5C-2, include the coordinates in order: (1,6), (2,7), (3,8), (4,9), (5,0), (6,0), (7,9), (8,8), (9,7), and (0,6). These coordinates are stored in the data fields in positions 1 through 0 respectively (see FIG. 5C-2) in the data set used as the authentication factor based on the path in FIG. 5C-1.

FIG. 5D-1 and its related figure, FIG. 5D-2, illustrate a path represented by arrows 4051, 4052 on instance 4050 of the frame of reference. The graphical path of FIG. 5D-1 and its position number representation in FIG. 5D-2, include the coordinates in order: (0,0), (0,9), (0,8), (0,7), (0,6), (9,6), (8,6), (7,6), (6,6), and (5,6). These coordinates are stored in the data fields in positions 1 through 0 respectively (see FIG. 5D-2) in the data set used as the authentication factor based on the path in FIG. 5D-1.

FIG. 5E-1 and its related figure, FIG. 5E-2, illustrate a path represented by arrows 4061, 4062, 4063, 4064, 4065 on instance 4060 of the frame of reference. The graphical path of FIG. 5E-1 and its position number representation in FIG. 5E-2 include the coordinates in order: (3,0), (3,9), (4,9), (4,0), (5,0), (5,9), (6,9), (6,0), (7,0), and (7,9). These coordinates are stored in the data fields in positions 1 through 0 respectively (see FIG. 5E-2) in the data set used as the authentication factor based on the path in FIG. 5E-1.

The ordered paths shown in FIGS. 5A-1 through 5E-1 and their related figures, FIGS. 5A-2 through 5E-2, are herein considered continuous ordered paths, because all of the locations have coordinates on the path are adjacent to coordinates of other locations on the path in order. Continuous paths may be easier to remember for some clients.

Also, all of the representative ordered paths have the same number of locations (or fields). Using the same number of locations (or fields) on each graphical path facilitates the execution of the RPDPR-SC authentication algorithm. In alternative, lengths of the ordered paths can vary from client to client.

Other embodiments of the invention use ordered paths that are non-continuous, such as described in reference to FIGS. 6A-1 to 6F-1 and their related figures, FIGS. 6A-2 to 6F-2.

FIG. 6A-1 and its related figure, FIG. 6A-2, illustrate a non-continuous path represented by arrows 6011, 6012, 6013 on instance 6010 of the frame of reference. The graphical path of FIG. 6A-1 and its position number representation in FIG. 6A-2 include the coordinates in order: (1,1), (2,2), (3,3), (8,3), (9,2), (0,1), (0,7), (0,8), (0,9), and (0,0). A discontinuity in the path occurs between coordinates (3, 3) and (8, 3). Also, a discontinuity occurs between coordinates (0, 1) and (0, 7). These coordinates are stored in the data fields in positions 1 through 0 (see FIG. 6A-2) respectively in the data set used as the authentication factor based on the path in FIG. 6A-1.

FIG. 6B-1 and its related figure, FIG. 6B-2, illustrate a non-continuous path represented by arrows 6021, 6022 on instance 6020 of the frame of reference. The graphical path of FIG. 6B-1 and its position number representation in FIG. 6B-2 include the coordinates in order: (6, 4), (7, 4), (8, 4), (9, 4), (0, 4), (0, 7), (9, 7), (8, 7), (7, 7), and (6, 7). These coordinates are stored in the data fields in positions 1 through 0 respectively (see FIG. 6B-2) in the data set used as the authentication factor based on the path in FIG. 6B-1.

FIG. 6C-1 and its related figure, FIG. 6C-2, illustrate a non-continuous path represented by arrows 6031, 6032, 6033 and cross 6034 on instance 6030 of the frame of reference. The path of FIG. 6C-1 and its position number representation in FIG. 6C-2 include the coordinates in order: (1, 1), (2, 1), (3, 1), (0, 1), (0, 2), (0, 3), (0, 0), (9, 0), (8, 0), and (1, 0). These coordinates are stored in the data fields in positions 1 through 0 respectively (see FIG. 6C-2) in the data set used as the authentication factor based on the path in FIG. 6C-1.

FIG. 6D-1 and its related figure, FIG. 6D-2, illustrate a non-continuous path represented by crosses 6041, 6042, 6043, 6044, 6045, 6046, 6047, 6048, 6049, 6059 on instance 6040 of the frame of reference. The graphical path of FIG. 6D-1 and its position number representation in FIG. 6D-2 include the coordinates in order: (1, 1), (3, 3), (5, 5), (7, 7), (9, 9), (1, 0), (3, 8), (5, 6), (7, 4), and (9, 2). These coordinates are stored in the data fields in positions 1 through 0 respectively (see FIG. 6D-2) in the data set used as the authentication factor based on the path in FIG. 6D-1.

FIG. 6E-1 and its related figure, FIG. 6E-2, illustrate a non-continuous path represented by crosses 6051, 6052, 6053, 6054 and arrow 6055 on instance 6050 of the frame of reference. The graphical path of FIG. 6E-1 and its position number representation in FIG. 6E-2 include the coordinates in order: (1, 1), (0, 1), (0, 0), (1, 0), (3, 8), (4, 7), (5, 6), (6, 5), (7, 4), and (8, 3). These coordinates are stored in the data fields in positions 1 through 0 respectively (see FIG. 6E-2) in the data set used as the authentication factor based on the path in FIG. 6E-1.

FIG. 6F-1 and its related figure, FIG. 6F-2, illustrate a non-continuous path represented by arrows 6061, 6062, 6063 and cross 6064 on instance 6060 of the frame of reference. The graphical path of FIG. 6F-1 and its position number representation in FIG. 6F-2 include the coordinates in order: (8, 0), (9, 0), (0, 0), (0, 9), (0, 8), (0, 7), (9, 8), (8, 9), (7, 0), and (9, 9). These coordinates are stored in the data fields in positions 1 through 0 respectively (see FIG. 6F-2) in the data set used as the authentication factor based on the path in FIG. 6F-1.

One Time Authentication Challenge as a Static Shape and Direction Sub-Path of the Full Graphical Ordered Path Having a Dynamic Digital Content FIG. 7A illustrates graphical user interface screen 8010, which is presented at the beginning of a stage of an authentication session based on RPDPR-SC. Screen 8010 is presented after the user name in field 3040 in FIG. 3B is recognized by server 1030 (FIG. 1). In other embodiments, for example, in a two-factor authentication case the screen 8010 is presented after the user name and password (or PIN) in FIG. 3C (fields 3040 and 3130 respectively) are recognized by server 1030 (FIG. 1). Interface 8010 prompts the client for fulfillment of the RPDPR-SC authentication factor. In the illustrated example, the graphical user interface screen 3010 in FIG. 3B (or in FIG. 3C in the two-factor authentication case) will be replaced with GUI 8010 in FIG. 7A. Stoplight icon 8020 appears red before data has been entered into data field 8030 or before login button 3060 is indicated. The stoplight icon 8020 appears yellow during client-server communications and before acceptance of the input data representing field content 8040. Stoplight icon 8020 appears green to signal successful authentication.

By indicating button 8050 marked with the black triangle, drop-down menu 8060 is displayed. The drop-down menu can be closed by clicking inside the menu on the upper left field with the black triangle mark, or anywhere outside of the menu. Drop-down menu 8060 comprises an instance of graphical representation of the frame of reference, such as a reference grid in this example, with characters randomly or pseudo-randomly positioned in the pre-defined locations. The reference grid includes the frame of reference, such as shown in FIG. 4A and FIGS. 5A-1 to 5E-1 and 6A-1 to 6F-1, with the locations on the grid populated by randomized characters. Thus, a character at the location with coordinates (4, 5) is the digit 8. Server 1030 in FIG. 1 produces a different instance of the array of characters for each instance of the reference grid 8060. The different instances of the array of characters can be generated randomly, or pseudo-randomly, in preferred embodiments. Alternatively, a set of previously generated arrays of characters can be utilized in random order. Other techniques can be utilized for making the presentation of the arrays of characters variable to strengthen the authentication factor.

User 8080 at terminal 8070 is presented with GUI 8010 in the browser or in the login screen of user's desktop or laptop, having instantiated grid 8060. The User 8080 knows a share secret full ordered path (including positions 1, 2, . . . , 0 in this example) and sub-path (including positions 1, 2, . . . , 6 in this example) represented by grid 8090 in FIG. 7A, which is pre-set before the authentication session during the user's account set up process. The user processes the random session-only digital content on the grid with the cognitive association to the full graphical ordered path and the authentication challenge 8120. Locations 8100 on grid 8090 represent the sub-path of the full graphical ordered path, which includes locations 8110 and 8100 together (see also FIG. 5D-1 and FIG. 5D-2). The one time authentication response OTAR 8040 is entered in field 8030 of GUI 8010, having contents derived now as follows:

The first field position of the challenge sub-path 8100 on grid 8090 displays the character 3 on grid 8060 pointing to the $3^{rd}$ field position of the path (8100 & 8110) on grid 8090. This field position on grid 8060 displays the character 0 which is entered as the first digit of OTAR 8040 into field 8030

The second field position of the challenge sub-path 8100 on grid 8090 displays the character 4 on grid 8060 pointing to the $4^{th}$ field position of the path (8100 & 8110) on grid 8090. This field position on grid 8060 displays the character 4 which is entered as the second digit of OTAR 8040 into field 8030

Going onward in a similar fashion along the sub-path 8100 through the remaining consequent field positions 3, 4, 5, and 6 one would derive entire OTAR 8040 as "0 4 7 4 5 6"

OTAR 8040 characters are entered into field 8030 either with a keyboard or clicking on any field on grid 8060 in GUI 8010 having the right digital content. For instance, OTAR 8040 "0 4 7 4 5 6" could be entered by clicking on fields on grid 8060 in FIG. 7A with the following pairs of horizontal and vertical coordinates along the rulers on grid 8060: (7, 9), (7, 1), (3, 6), (1, 8), (9, 4), and (4, 4).

Then, indicating LOGIN button 3060, OTAR 8040 is sent to server 1030, which compares it with calculated one at the server. Stoplight 8020 turns meanwhile from red to yellow. If the comparison is successful, a positive authentication signal is sent to the user's GUI 8010 and other sub-systems that may need to know this information. Stoplight 8020 turns from yellow to green. Otherwise, the error message is sent to user 8080 in GUI 8010 that OTAR is incorrect and should be reentered. Stoplight 8020 turns from yellow to red.

FIG. 7B illustrates the same case as FIG. 7A except that OTAR 8040 is entered as echo dots into field 8030 of GUI 8010 complicating for an intruder entry data recording/observation for security reasons.

FIG. 7C illustrates the same case as FIG. 7A except another instantiation of grid 8060 in GUI 8010 which leads to different digital content on grid 8060 and as a consequence, another OTAR 8040 "4 7 5 3 5 4" in data entry field 8030 having the same full graphical ordered path (8100 & 8110) and the same authentication challenge sub-path 8100 as in FIG. 7A. This example demonstrates a dynamic content of OTAR from one authentication session to another, while the built into the path authentication challenge sub-path has a static shape and direction.

FIG. 8A and FIG. 8B illustrate the cases similar to FIG. 7A and FIG. 7C except that the full graphical ordered path (dark 8100 & light 8110 shaded field positions on grid 8090; see also FIG. 6A-1 and FIG. 6A-2) is not continuous any more but an interrupted one, having discontinuities which further complicate for an intruder credential reengineering.

There are several unique capabilities in RPDPR-SC authentication factor to outline here:

1. Unlike the RPDPR authentication factor described in my prior patent referred to above, where the field content on a grid was irrelevant to the OTAR, but rather used only to veil the actual field locations (fields with specific coordinates on a grid to be indicated), RPDPR-SC authentication factor's OTAR is content driven only—it is irrelevant how the character is input that is used to create OTAR, as long as the content is correct. This change allows hiding the actual shared secrets in RPDPR-SC authentication factor—the path and the challenge built into the path. Indeed, one does not reveal locations related to them, because any arbitrary locations with the right content can be clicked on, or the data can be entered with a keyboard, eliminating entropy leakage during an authentication session, that might otherwise occur in a RPDPR system by just recording/observing the locations processed by the user to generate the OTAR.

2. The combinatorial capacity of the OTAR is scalable with the length of the sub-path used to deliver the authentication challenge—each location in a sub-path leads to one digit in OTAR. Preferred embodiment challenges in FIGS. 7A, 7B, 8A, 8B have six locations leading to a six digit OTAR. The probability to guess one digit in OTAR on a reference grid is 0.1 (there are randomly populated on a 10 by 10 grid ten digits with value 1, ten digits with value 2, and so on up to ten digits with value 0)—therefore, the probability to guess six digits in an OTAR is equal to one chance per million. Analysis shows that reengineering user credentials (the full graphical ordered path and the authentication challenge sub-path) by recording/observing OTAR and relating it to content on a grid would be a daunting computational task:

The number of various continuous graphical paths and graphical paths with different numbers of discontinuities, and each graphical path having ten fields length on a 10 by 10 field grid would be 100*99*98*97*96*95*94*93*92*91~6.28e19

Best microprocessors achieved ~5 GHz clock rate barrier by the middle of the first decade of the $21^{st}$ century. Thus, currently available ~5E10 instructions per second (assuming microprocessor RISC pipelined architecture with up to 10 stages per cycle). A very conservative assumption is made that the attacking computers have 100% efficiency of their CPU utilization during an attack. In other words, testing each possible combination of a graphical path on a grid against the particular content on a grid and in OTAR will consume only one microprocessor instruction. Then, the deciphering time would be approximately equal to 6.28e19/5e10~1.26e9 Seconds, which is near 40 years computational time for one microprocessor. Assuming a computer farm of 100 microprocessors, it is still near 5 months computational time.

There can be false path combinations per one computational cycle for a given OTAR digital content. One may require information from additional computational cycles using another OTAR and grid content to separate out false paths which would increase the deciphering time and complicate the whole process.

If a challenge sub-path is not known a priori with respect to the path (say it is not first six field positions along the path as it was chosen in the preferred embodiments of this invention, but an arbitrary sub-path), it would further increase computational time to decipher credentials.

Network and Hardware Resources

FIG. 9 illustrates a client-server system including authentication resources according to the RPDPR-SC authentication factor of the present invention. The client subsystem 1010 includes data entry devices 1001 (keyboard, mouse, voice input, etc.), a display device 1002 (CRT, LCD panel, mobile communication device, etc.), and a physical platform 1003 (personal computer, hand held computer, internet appliance, etc.) including a processing unit, memory, and other data processing resources. Software running in the client includes a browser 1005 or a "thin" software client 1006 such as may be provided on personal digital assistants, cell phones, and other simple Internet appliances which may not support full browser functionality. The browser 1005 includes Java Virtual Machine, a .NET environment, or other architectural software features, which support the client-server dialog. Likewise, the "thin" software client 1006 may support the client-server dialog. Finally, an interface 1004 to the network communication media 1020 is provided. The communication media 1020 may be a private or pubic, local area network or a wide area network using wired, wireless or optical media in representative systems.

The server subsystem 1030 includes network server resources 1007, an account management utility 1008 for the user accounts subject of the authentication process, and a platform 1009 including a processing unit, memory, disk space and other data processing resources. Core program 1013 supporting the authentication process is included in the server subsystem 1030. The core program may be implemented using Java or .NET object-oriented technology for examples. Also, a server database (or a directory service, such as LDAP) and database connector 1012 is included. Finally, an interface 1011 to communication media for server LAN/WAN communication lines 1020 is provided. In some embodiments, the server and server data are implemented with security features to protect user account information files from intruders.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An interactive method for authentication of a client, comprising:

storing data defining a graphical representation of a frame of reference adapted for rendering on a display, the frame of reference including a number N of pre-defined locations in the frame of reference having coordinates on the frame of reference;

storing a data set associated with the client in a memory, the data set including a first shared secret and a second shared secret, the first shared secret comprising data identifying a first plurality of the pre-defined locations defining an ordered path on the frame of reference, and the second shared secret comprising data identifying a second plurality of the pre-defined locations on the frame of reference;

receiving via a first data communication, a client identifier from the client and initiating an authentication session;

presenting via a second data communication, to the client an instance of the graphical representation of the frame of reference in response to the request for use in the authentication session, including composing the instance by positioning characters in the number N of pre-defined locations according to a pattern different than used in other authentication sessions with the client, the characters consisting of members of a character set including M members, where N is greater than 2M, and in which characters in the second plurality of pre-defined locations identified by the second shared secret comprise a challenge pointing to pre-defined locations on the ordered path in which characters comprising a response are positioned in the instance;

accepting input data from the client via a third data communication, the input data including characters entered by the client using an input device; and determining whether the input data matches the response pointed to by the challenge and if the input data matches, signaling successful authentication, and if the input data does not match, signaling failed authentication.

2. The method of claim 1, wherein said character set consists of digits 0 to 9.

3. The method of claim 1, wherein said second plurality of pre-defined locations consists of a subset of said first plurality of pre-defined locations along said ordered path.

4. The method of claim 1, wherein said characters are positioned randomly or pseudo-randomly on the instance by a server.

5. The method of claim 1, including presenting to the client from a server via a data communication medium, an input construct for entry of said input data, and wherein said accepting input data from the client includes accepting data based on said input construct.

6. The method of claim 1, including presenting said instance of said graphical representation to the client using a graphical user interface, and the graphical user interface includes input fields for inserting characters to fulfill the challenge.

7. The method of claim 1, including presenting to the client an input construct for account set up, and accepting data from the client based on the input construct, to identify the ordered path.

8. The method of claim 1, including presenting to the client an input construct for account set up, and accepting data from the client based on the input construct, to identify the ordered path, wherein the input construct includes a graphical representation of said frame of reference.

9. The method of claim 1, wherein said ordered path set consists of a continuous ordered path on said frame of reference.

10. The method of claim 1, wherein said ordered path consists of a non-continuous ordered path on said frame of reference.

11. The method of claim 1, wherein said client provides input data in a client system coupled to communication media.

12. The method of claim 1, wherein said client provides input data in a client system, including a browser coupled to communication media.

13. The method of claim 1, including:

detecting an attempt to access a protected network resource by the user;

presenting, in response to the detected attempt to access a protected network resource, an interface to the client via a data communication medium, the interface supporting said indicating and said accepting; and if the input data matches, signaling authentication of the client.

14. The method of claim 1, wherein said data set comprises a client identifier; and including supplying to the client via a data communication medium using a process executed by a computer system, a prompt for entry the client identifier; and accepting at the server data from the client via a data communication medium, the data indicating the client identifier for the client, and verifying that the data indicating the client identifier matches the stored client identifier.

15. An authentication system for a client, comprising:

data processing resources, including a processor, memory and a communication interface;

data stored in said memory defining a graphical representation of a frame of reference adapted for rendering on a display, the frame of reference including pre-defined locations in the frame of reference having coordinates on the frame of reference;

a data set stored in the memory comprising a client identifier, a first shared secret comprising data identifying a first plurality of the pre-defined locations defining an ordered path on the frame of reference, and a second shared secret comprising data identifying a second plurality of the pre-defined locations on the frame of reference; and an authentication server comprising executable instructions stored in said memory adapted for execution by the data processing resources, including logic to receive via a first data communication, a client identifier from the client and initiate an authentication session;

logic to generate and present to the client an instance of the graphical representation of the frame of reference via a second data communication, for use in the authentication session, including composing the instance by positioning characters in the number N of pre-defined locations according to a pattern different than used in other authentication sessions with the client, the characters consisting of members of a character set including M members, where N is greater than 2M, and in which characters in the second plurality of pre-defined locations identified by the second shared secret comprise a challenge pointing to pre-defined locations on the ordered path in which characters comprising a response are positioned in the instance;

logic to accept input data from the client via a third data communication, the input data including characters entered by the client using an input device; and logic to determine whether the input data matches the response pointed to by the challenge, and if the input data matches, to signal successful authentication, and if the input data does not match, to signal failed authentication.

16. The system of claim 15, wherein said character set consists of digits 0 to 9.

17. The system of claim 15, wherein the second plurality of pre-defined locations consists of a subset of the first plurality of pre-defined locations along said ordered path.

18. The system of claim 15, wherein said characters in said instance are randomly or pseudo-randomly generated by a server.

* * * * *